June 30, 1953
D. A. McCAULAY ET AL
2,644,017
DISPROPORTIONATION OF DIETHYLBENZENE
Filed June 29, 1951
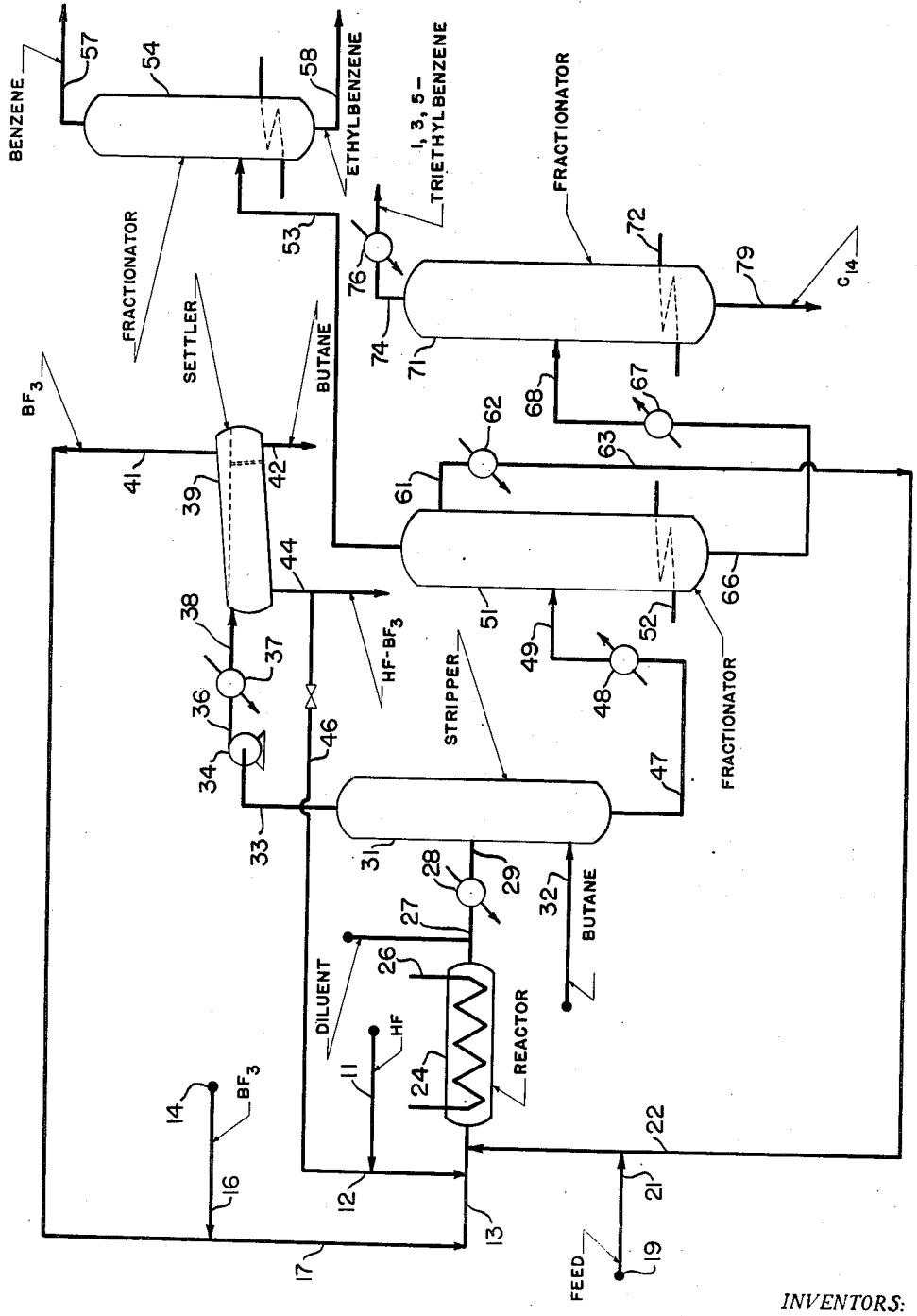
INVENTORS:
DAVID A. McCAULAY
ARTHUR P. LIEN
BY:
Michael Dufineer
ATTORNEY:

Patented June 30, 1953

2,644,017

UNITED STATES PATENT OFFICE 2,644,017

DISPROPORTIONATION OF DIETHYLBENZENE

David A. McCaulay, Chicago, Ill., and Arthur P. Lien, Highland, Ind., assignors to Standard Oil Company, Chicago, Ill., a corporation of Indiana Application June 29, 1951, Serial No. 234,416

7 Claims. (Cl. 260—671)

This invention relates to the disproportionation of diethylbenzenes. More particularly, it relates to the preparation of triethylbenzenes by the disproportionation of diethylbenzene. Still more particularly, it relates to the preparation of symmetrical triethylbenzene from diethylbenzene.

It is well known that the dialkylbenzenes can be disproportionated in the presence of aluminum chloride catalyst to a mixture of benzene, alkylbenzene, dialkylbenzene, trialkylbenzene and higher alkylbenzenes. The yields of the higher alkylbenzenes by the prior art processes are quite high and render the preparation of trialkylbenzenes by this route uneconomic. We have discovered a process for the disproportionation of diethylbenzene which gives excellent yields of the desired symmetrical 1,3,5-triethylbenzene with very little loss to the unwanted tetra and higher ethylbenzenes.

Polystyrene resins now occupy a very important place in the commercial plastics field. However, the softening point of the polystyrene resins is lower than the boiling point of water, which deficiency renders these polystyrene resins unsuitable for many uses. It has been found that the softening point of the polystyrene-type resin can be raised markedly by the addition of alkyl substituents to the styrene group; for example, substantially pure 1,3,5-dimethylstyrene polymerizes to form a resin having a softening point of about 120° C. and an even higher softening point may be obtained by the polymerization of 1,3,5-diethylstyrene. Diethylstyrene may be obtained by the dehydrogenation of 1,3,5-triethylbenzene. Also 1,3,5-triethylbenzene can be converted to 1,3,5-divinylethylbenzene which is another intermediate for the manufacture of plastics.

One object of this invention is to produce 1,3,5-triethylbenzene by the disproportionation of diethylbenzene. Another object is to disproportionate diethylbenzene to 1,3,5-triethylbenzene with little formation of undesired higher alkylbenzenes. Yet another object is to disproportionate diethylbenzene by treatment with a particular catalyst composition consisting essentially of liquid HF and $BF_3$ at a temperature of less than about 100° F.

Para-xylene, ortho-xylene and mixtures thereof isomerize to meta-xylene readily without disproportionation when treated with liquid HF and at least 1 mol of $BF_3$ per mol of xylenes at a temperature of less than about 90° F. as described and claimed in our copending application, Serial No. 234,414, entitled Isomerization of Xylenes and filed on June 29, 1951. When we attempted to extend our work on the isomerization of xylenes (dimethylbenzene) to a mixture of higher dialkylbenzene isomers under the same conditions, we were surprised to find that the reaction proceeded to a different product mixture than the expected 1,3-dialkylbenzene product. We found that the dialkylbenzenes, where the alkyl substituent contains 2 or more carbon atoms, disproportionate to a mixture of benzene, alkylbenzene, 1,3-dialkylbenzene, 1,3,5-trialkylbenzene and, in some cases, higher alkylbenzenes when treated with liquid HF and at least 1 mol of $BF_3$ per mol of dialkylbenzene charged at about ambient temperatures. However, we have discovered that the dialkylbenzenes, wherein the alkyl substituent contains 3 or more carbon atoms, are extremely susceptible to the action of our liquid HF-$BF_3$ catalyst and very rapidly disproportionate to the tetra and even higher number of alkyl substituents. And furthermore, the dialkylbenzenes containing three or more carbon atoms in the alkyl substituent tend to undergo a cracking reaction with the formation of tars even at ambient temperatures. We have discovered that diethylbenzene can be disproportionated at particular conditions and catalyst composition to 1,3,5-triethylbenzene with very little formation of the higher alkylbenzenes.

The dialkylbenzenes react with $BF_3$ (apparently 1 mol of $BF_3$ per mol of dialkylbenzene) to form complexes which are soluble in liquid HF. These complexes differ in stability; the meta-isomer complex is the most stable, and the para-isomer complex the least stable. It is probable that the complex includes 1 or more mols of HF per mol of $BF_3$. In addition to its action as a solubility promoter for the dialkylbenzenes, the $BF_3$ catalyzes the disproportionation of the dialkylbenzenes in liquid HF solution to trialkylbenzenes and polyalkylbenzenes; the degree of the disproportionation as evidenced by dialkylbenzene disappearance and the direction thereof as evidenced by the amount of the higher alkylbenzene product(s) formed depends on the amount of liquid HF and $BF_3$ present and particularly the temperature at which the treatment is carried out.

It is necessary that sufficient liquid HF be present to dissolve all the $BF_3$-diethylbenzene complex formed. The presence of HF in excess of this minimum amount is preferable because the excess HF has a beneficial effect on the degree of disproportionation. The amount of liquid HF used should be between about 50 volume percent to about 600 volume percent, based on diethylbenzenes charged; preferably, about 100 to about 300 volume percent should be used. We have found that particularly good results are obtained when using about 200 volume percent of liquid HF. Since water reacts with $BF_3$ to form undesired hydrates, the liquid HF should be substantially anhydrous and in no case should more than 1 or 2 percent of water be present.

We have discovered that the disproportionation of diethylbenzene will proceed in appreciable yield only when all the diethylbenzene is brought into solution in the liquid HF (which condition will be spoken of in this specification as the homogeneous phase). The homogeneous phase can be attained by using about 1 mol of $BF_3$ per mol of diethylbenzene; slightly less may be used as the complex appears to solubilize the uncomplexed diethylbenzene. However, we prefer to use at least 1 mol of $BF_3$ since the direction of disproportionation changes and the degree of disproportionation increases with the complete complexing of the diethylbenzene. Although good results are obtained when using the minimum amount of $BF_3$ necessary to form a homogeneous phase, larger amounts can be used. We prefer to use from at least 1 to about 5 mols of $BF_3$ and particularly good results are obtained when using from 1 to about 3 mols of $BF_3$ per mol of diethylbenzene.

The presence of inert, HF-insoluble hydrocarbons such as propane, butane, pentane, and light naphtha has been found to be detrimental. These hydrocarbons are referred to herein as diluents even though they are not soluble to any appreciable extent in the liquid HF. The diluent acts as a solvent to draw some of the diethylbenzene out of the acid phase even though, theoretically, sufficient $BF_3$ has been used to complex completely the diethylbenzene present. We have found that the diethylbenzene present in the separate diluent (raffinate phase) portion is not disproportionated appreciably even though a large excess of $BF_3$ may be present in the reactor. If the amount of diluent used is very large, disproportionation of the diethylbenzene may be substantially halted. Diluent should therefore be avoided; if any is present, it should be limited to amounts small enough to be solubilized into the liquid $HF$-$BF_3$-complex homogeneous phase.

We have found that the diethylbenzene charged to our process should not contain appreciable amounts of either benzene, xylene or ethylbenzene. These lower aromatics appear to displace the equilibrium existing in the homogeneous phase away from the desired products; i. e. the yield of triethylbenzene is markedly reduced by the presence of even a small amount of added benzene, xylene, or ethylbenzene.

We have found that the degree of and the direction of disproportionation is dependent upon both temperature and reaction time. The reaction temperature that may be used in the disproportionation of diethylbenzene is limited by the fact that at above about 100° F. appreciable amounts of undesirable by-products are obtained, and at temperatures in excess of about 120° F. considerable cracking takes place. Temperatures as low as 0° F. can be used if the correspondingly increased reaction times to obtain the desired product composition can be tolerated. We prefer to operate at temperatures of at least about 60° F. Particularly good results are obtained at between 70° and 90° F.

The length of time that it is necessary to continue the reaction in order to attain equilibrium is dependent upon the temperature at which the reaction is carried out. The lower the temperature, the longer the reaction time needed. The reaction proceeds quite rapidly at ambient temperatures; for instance, about 15 minutes is sufficient at 60° F. At the higher temperatures approaching 100° F. the reaction time is, for practical purposes, less than 1 minute. Even at temperatures as low as 0° F. equilibrium can be obtained in about 2 hours. In order to reduce the formation of tars and other side reactions when operating at temperatures in the neighborhood of 100° F. the reaction time should be only slightly in excess of the minimum time needed to attain equilibrium. At our preferred temperature range of 70° F. to about 90° F. the reaction time should be between about 1 minute and 30 minutes.

For comparative purposes, two runs are described in detail below.

Run A

The apparatus employed was a 1570 ml. carbon steel autoclave fitted with a 1725 R. P. M. mechanical stirrer. A 259 gram (1.93 mols) sample of diethylbenzene, 500 grams of liquid HF (170 volume percent on the diethylbenzene) and 139 grams (2.04 mols) of $BF_3$ were added to the reactor. The reaction mixture was agitated at 65° F. for 30 minutes. At the end of this time the mixture was allowed to settle for 10 minutes.

The contents of the reactor were withdrawn into a dry ice-cooled flask containing about 600 ml. of water. The reactor contained only one homogeneous phase; the benzene and ethylbenzene formed in the disproportionation were solubilized by the $BF_3$ complex and stayed in the liquid HF instead of forming a separate raffinate phase. The decomposition of the $BF_3$-complexes by the water resulted in the separation of an oil phase and an aqueous $HF$-$BF_3$ phase.

The oil phase was withdrawn and washed with ammonium hydroxide to remove traces of dissolved HF and $BF_3$. The oil product was fractionated through a column containing 30 theoretical plates. The oil was separated by this fractionation into a benzene portion, a $C_8$ aromatic portion, a $C_{10}$ aromatic portion, a $C_{12}$ aromatic portion, and a $C_{14}$ aromatic portion. The product distribution was determined by a combination of physical properties, ultraviolet and infrared absorption analysis. The product distribution in this run was as follows:

|  | Mols | Percent |
| --- | --- | --- |
| Benzene | 0.28 | 15 |
| Ethylbenzene | 0.26 | 13 |
| 1,3-Diethylbenzene | 0.55 | 29 |
| 1,3,5-Triethylbenzene | 0.75 | 39 |
| Tetraethylbenzene | 0.08 | 4 |

The product distribution indicates that the diethylbenzene charged is not only disproportionated but also that portion not disproportionated is isomerized to the meta-isomer. Within the error of the analytical procedure the triethylbenzene fraction appears to be entirely the symmetrical 1,3,5-triethylbenzene. This 1,3,5-triethylbenzene fraction has the following characteristics:

A boiling point of 218° C; a refractive index of $n_D^{20}$, 1.4960; and a specific gravity of 0.862.

The properties given in J. Am. Chem. Soc. 68, 1131 (1946) are, boiling point, 215.9° C.; refractive index, 1.4958; and specific gravity, 0.862.

*Run B*

A 233.5 gram (1.74 mols) sample of diethylbenzene, 500 grams of liquid HF (190 volume percent on diethylbenzene), 118 grams (1.73 mols) of $BF_3$ and 186 grams of n-heptane (100 volume per cent based on diethylbenzene) were added to the reactor. The reaction mixture was agitated at 65° F. for 90 minutes. After a 10 minute settling period, the contents were withdrawn from the reactor. Two phases were found to be present in the reactor.

The extract phase (acid phase) was withdrawn into a flask containing about 600 ml. water, whereupon it decomposed into an oil layer and an acid layer. The oil layer was washed with ammonium hydroxide to remove traces of dissolved HF and $BF_3$. The oil was fractionated into various cuts.

The raffinate phase was withdrawn and washed with ammonium hydroxide to remove traces of dissolved HF and $BF_3$. The raffinate was fractionated to remove the n-heptane and the raffinate oil was then further fractionated into various cuts.

The product distribution of the raffinate oil and the extract oil as determined by analysis are shown below:

|  | Raff. | Ext. | Total | Percent |
|---|---|---|---|---|
| Benzene | .09 | .12 | .21 | 12 |
| Ethylbenzene | .15 | .10 | .25 | 15 |
| 1,3-Diethylbenzene | .22 | .41 | .63 | 37 |
| 1,3,5-Triethylbenzene | .00 | .52 | .52 | 30 |
| Tetraethylbenzene | .00 | .11 | .11 | 6 |

This run shows the detrimental effect of the use of a diluent on the yield of the desired triethylbenzene. The diethylbenzene dissolved by the diluent apparently is not affected by the catalyst.

The accompanying drawing shows one embodiment of our process for the production of substantially pure 1,3,5-triethylbenzene by the disproportionation of diethylbenzene. It is to be understood that this embodiment is shown for the purposes of illustration only and that many other variations of our process can be readily devised by those skilled in the art.

Substantially anhydrous liquid HF from source 11 is passed through line 12 into line 13. $BF_3$ from source 14 is passed through lines 16 and 17 into line 13. Diethylbenzene from source 19 is passed through lines 21 and 22 into line 13 where it is commingled with the HF and $BF_3$. The $BF_3$ usage may vary from at least 1 to about 5 mols per mol of diethylbenzene and preferably between 1 and 3 mols, for example, 1.5 mols. Enough HF must be used to dissolve all the $BF_3$-diethylbenzene complex and preferably some additional HF should be present. We prefer to use between about 100 and 300 volume percent of liquid HF based on diethylbenzene, for example, about 200 volume percent. When operating at temperatures above the boiling point of HF and also when using excess $BF_3$, sufficient pressure must be maintained on the system to keep the HF liquid.

The commingled stream passes from line 13 into reactor 24 which is provided with a coil 26. The coil 26 is used to maintain the contents of the reactor at the desired reaction temperature, for example, about 75° F. The reaction mixture is held in reactor 24 for a time sufficient to attain equilibrium composition, but not in any great excess of that time in order to avoid undesirable side reactions. A suitable reaction time at about 75° temperature is about 5 minutes. From reactor 24 the materials pass through line 27, cooler 28, and line 29 into stripper 31. When the reaction is carried out at about ambient temperature, there is no need to cool the reaction products in cooler 28. However, when operating at temperatures in the neighborhood of 100° F., it is desirable to cool the reaction mixture in order to prevent the formation of undesirable by-products and cracking.

In stripper 31 the HF and $BF_3$ are removed from the reaction products under vacuum provided by vacuum pump 34. The stripping may be facilitated by the introduction of a stripping agent, such as butane, into stripper 31 through line 32. The stripping agent, HF and $BF_3$, pass out of stripper 31 through line 33 through vacuum pump 34, line 36, through cooler 37 and line 38 into settler 39. In cooler 37 the stripping agent and HF are condensed and these two are separated in settler 39. The free $BF_3$ passes out of settler 39 through line 41 and is recycled to line 17 for reuse in the process. The stripping agent passes out of settler 39 through line 42 and is recycled to stripper 31. The liquid HF saturated with $BF_3$ passes out of settler 39 through line 44 and is recycled to line 12 through valved line 46.

From stripper 31 the product mixture passes through line 47, heater 48, and line 49 into fractionator 51. Fractionator 51 is provided with a reboiler 52. From fractionator 51 the benzene and ethylbenzene fractions are taken overhead through line 53 and are passed into fractionator 54 which is provided with a reboiler 56. Near the top of fractionator 51 a cut of diethylbenzene is withdrawn through line 61; this diethylbenzene fraction is condensed in cooler 62 and is passed through line 63 into line 22 for reuse in the process.

A substantially pure benzene fraction is taken overhead from fractionator 54 through line 57; the benzene portion is sent to storage or to further treatment. Substantially pure ethylbenzene is withdrawn from the base of fractionator 54 through line 58.

From the bottom of fractionator 51 the $C_{12}$ and $C_{14}$ aromatic fractions are withdrawn through line 66 and are passed through heater 67 and line 68 into fractionator 71 which is provided with a reboiler 72. Fractionator 71 splits the feed into an overhead fraction which passes through line 74 and condenser 76 to storage; the overhead consists of substantially pure 1,3,5-triethylbenzene. From the bottom of fractionator 71 is withdrawn through line 79 a by-product fraction of tetraethylbenzene which may be recycled to reactor 24, if desired.

When our process is operated at temperatures in the neighborhood of 100° F. it may be desirable to add a cold diluent such as butane into line 27 instead of depending entirely on cooler 28 to reduce the temperature of the reaction mixture. Addition of diluent at this point is not harmful as the reaction has been completed; the diluent does help to avoid undesirable side-reactions. When the diluent is added through line 27, normally, it will not be necessary to add a stripping agent into stripper 31.

We claim:

1. A process for the disproportionation of diethylbenzene which process comprises the steps of contacting under substantially anhydrous conditions a feed comprising essentially diethylbenzene in the absence of other aromatic hydrocarbons with at least 1 mol of $BF_3$ per mol of diethylbenzene and sufficient liquid HF to dissolve all of the $BF_3$-diethylbenzene complex and form a single phase homogeneous solution, at a temperature below about 100° F. for a time sufficient to produce appreciable quantities of 1,3,5-triethylbenzene and separating the HF and $BF_3$ from the product mixture.

2. The process of claim 1 wherein the amount of liquid HF present is between about 50 and 600 volume percent, based on diethylbenzene.

3. The process of claim 1 wherein the reaction temperature is between 0° F. and 100° F. and the reaction time is between 1 minute and 2 hours.

4. A process for the production of 1,3,5-triethylbenzene which comprises contacting under substantially anhydrous conditions a feed comprising essentially diethylbenzene in the absence of other aromatic hydrocarbons in a single phase homogeneous system with from 50 to 600 volume percent of liquid HF, based on diethylbenzene, and from at least 1 mol to about 5 mols of $BF_3$ per mol of said diethylbenzene, at a temperature between about 60° F. and 100° F. for a period of time from about 1 minute to about 30 minutes, removing the HF and $BF_3$ from the reaction products and separating the 1,3,5-triethylbenzene from the reaction products.

5. The process of claim 4 wherein the amount of liquid HF is between 100 and 300 volume percent.

6. The process of claim 4 wherein the reaction temperature is between 70° F. and 90° F.

7. A process for the disproportionation of diethylbenzene feed which comprises contacting under substantially anhydrous conditions a feed comprising essentially diethylbenzene in the absence of other aromatic hydrocarbons in a single phase homogeneous system with 100 to 200 volume percent of liquid HF, based on said feed, and from at least 1 mol to about 3 mols of $BF_3$ per mol of said feed at a temperature between about 70° F. and 90° F. for a time between about 1 minute and 30 minutes, separating the HF and $BF_3$ from the reaction products and recycling these to the disproportionation reaction, recovering the unconverted diethylbenzene and the 1,3,5-triethylbenzene from the other reaction products and recycling said diethylbenzene to the disproportionation reaction.

DAVID A. McCAULAY.
ARTHUR P. LIEN.

References Cited in the file of this patent

UNITED STATES PATENTS

| Number | Name | Date |
|---|---|---|
| 2,521,444 | Brooke et al. | Sept. 5, 1950 |
| 2,528,893 | Lien et al. | Nov. 7, 1950 |